(12) United States Patent
Kang et al.

(10) Patent No.: US 8,305,562 B2
(45) Date of Patent: Nov. 6, 2012

(54) DEPTH IMAGE GENERATING METHOD AND APPARATUS

(75) Inventors: Byong-min Kang, Incheon (KR);
Do-kyoon Kim, Seongnam-si (KR);
Kee-chang Lee, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 1047 days.

(21) Appl. No.: 12/216,631

(22) Filed: Jul. 8, 2008

(65) Prior Publication Data

US 2009/0123061 A1    May 14, 2009

(30) Foreign Application Priority Data

Nov. 13, 2007    (KR) .................. 10-2007-0115540

(51) Int. Cl.
*G01C 3/08*    (2006.01)
(52) U.S. Cl. .............. 356/5.08; 356/3.01; 356/4.01; 356/4.1; 356/5.01; 356/5.1
(58) Field of Classification Search ........ 356/3.01–3.15, 356/4.1–4.1, 5.01–5.15, 6–22, 28, 28.5
See application file for complete search history.

(56) References Cited

U.S. PATENT DOCUMENTS

| | | | |
|---|---|---|---|
| 6,373,557 B1 * | 4/2002 | Mengel et al. | 356/4.07 |
| 6,822,681 B1 | 11/2004 | Aoki | |
| 7,212,278 B2 * | 5/2007 | Doemens et al. | 356/5.01 |

FOREIGN PATENT DOCUMENTS

JP    2005-214743    8/2005

* cited by examiner

*Primary Examiner* — Luke Ratcliffe
(74) *Attorney, Agent, or Firm* — Staas & Halsey LLP

(57) ABSTRACT

A method of and apparatus for generating a depth image are provided. The method of generating a depth image includes: emitting light to an object for a first predetermined time period; detecting first light information of the object for the first predetermined time period from the time when the light is emitted; detecting second light information of the object for the first predetermined time period a second predetermined time period after the time when the light is emitted; and by using the detected first and second light information, generating a depth image of the object. In this way, the method can generate a depth image more quickly.

15 Claims, 6 Drawing Sheets

DEPTH IMAGE GENERATING METHOD AND APPARATUS

CROSS-REFERENCE TO RELATED APPLICATIONS

This application claims the benefit of Korean Patent Application No. 10-2007-0115540, filed on Dec. 13, 2007, in the Korean Intellectual Property Office, the disclosure of which is incorporated herein in its entirety by reference.

BACKGROUND

1. Field

One or more embodiments of the present invention relates to a method of and apparatus for generating a depth image of an object.

2. Description of the Related Art 3-dimensional (3D) image sensing technology for acquiring in real-time color information formed with red (R) value, green (G) value, and blue (B) value of each pixel forming an image, and depth information indicating the depth value of each pixel forming the image, and providing the information to a user performs a critical role in making the user feel a visual reality effect and experience a virtual environment.

Also, this 3D image sensing technology is widely utilized in the face tracking or face recognition field, the game field requiring recognition of movement of a user, the digital camera field, in the airbag adjustment field according to the position or build of a passenger, and the navigation field.

Meanwhile, in this 3D image sensing technology, enhancement of a frame rate which is the number of frames that can be acquired in a unit time can make a very important contribution to improvement of picture quality, and for the enhancement of the frame rate, it is important to acquire depth image information more quickly.

SUMMARY

One or more embodiments of the present invention provides a depth image generating method and apparatus capable of enhancing a frame rate by quickly acquiring a depth image of an object.

According to an aspect of the present invention, there is provided a method of and apparatus for generating a depth image, the method including: emitting light to an object for a first predetermined time period; detecting first light information of the object for the first predetermined time period from the time when the light is emitted; detecting second light information of the object for the first predetermined time period a second predetermined time period after the time when the light is emitted; and by using the detected first and second light information, generating a depth image of the object.

According to another aspect of the present invention, there is provided a computer readable recording medium having embodied thereon a computer program for executing the method of generating a depth image.

According to another aspect of the present invention, there is provided an apparatus for generating a depth image, the apparatus including: a light emission unit emitting light to an object for a first predetermined time period; a first light detection unit detecting first light information of the object for the first predetermined time period from the time when the light is emitted; a second light detection unit detecting second light information of the object for the first predetermined time period a second predetermined time period after the time when the light is emitted; and a depth image generation unit, by using the detected first and second light information, generating a depth image of the object.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
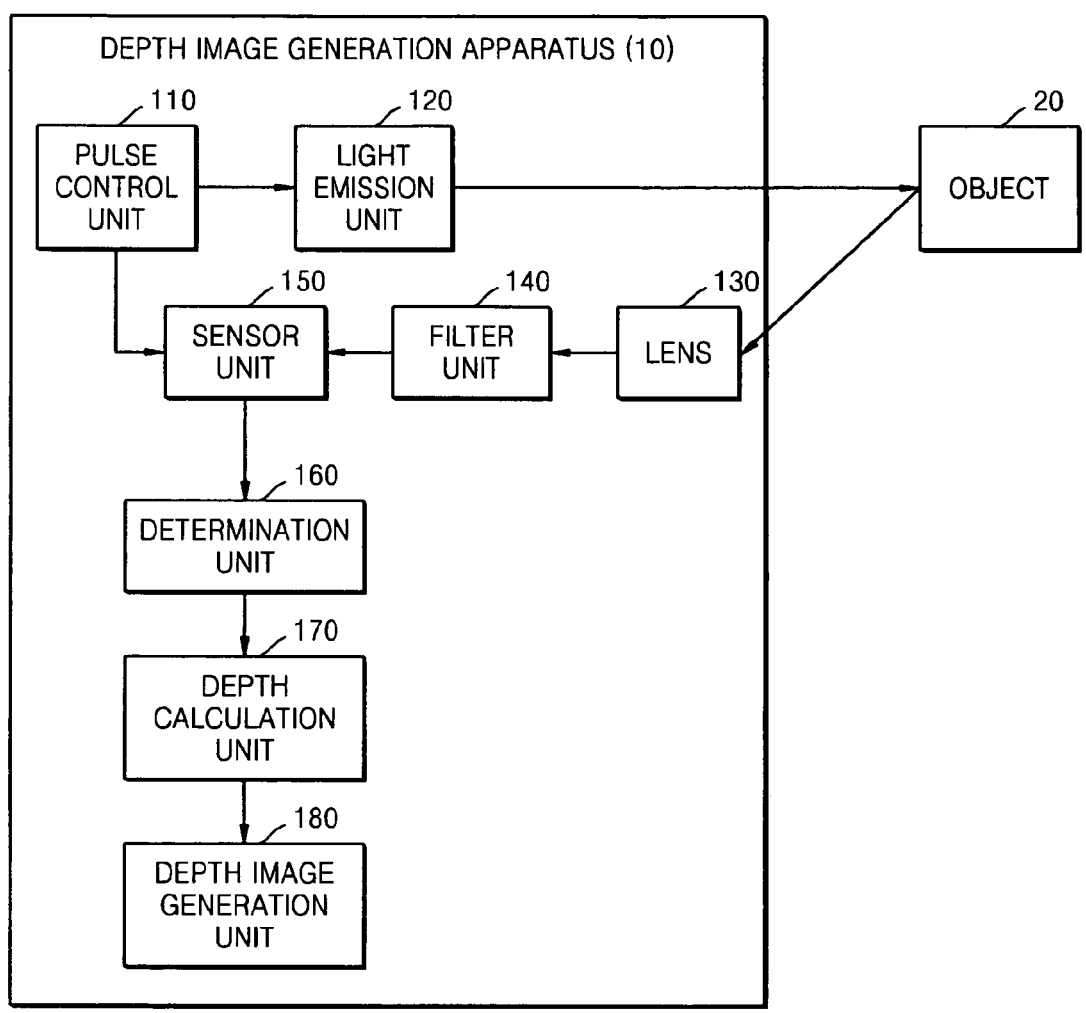
FIG. 1 is a block diagram illustrating a structure of an apparatus for generating a depth image according to an embodiment of the present invention.

Reference will now be made in detail to embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a block diagram illustrating a structure of an apparatus for generating a depth image according to an embodiment of the present invention. Referring to FIG. 1, the apparatus 10 for generating a depth image includes a pulse control unit 110, a light emission unit 120, a lens 130, a filter unit 140, a sensor unit 150, a determination unit 160, a depth calculation unit 170, and a depth image generation unit 180.

The pulse control unit 110 generates a control pulse signal for controlling the light emission unit 120 and the sensor unit 150. In particular, the pulse control unit 110 generates a control pulse signal which is on and off alternately according to a predetermined period, and provides the signal to the light emission unit 110 and the sensor unit 150. The light emission unit 120 is a light emitting diode (LED) array, a laser device, or the like, and emits light to an object 20 according to a control pulse signal provided from the pulse control unit 110. For example, if the control pulse signal provided from the pulse control unit 110 is on, the light emission unit 120 emits light to the object 20, and if the provided control pulse signal is off, the light emission unit 120 does not emit light to the object 20. In this case, the light emission unit 120 emits light of an infrared ray, an ultraviolet ray, or a visible ray, and it is assumed that a time period in which light is emitted by the light emission unit 120 is T0.

The lens 130 collects light incident from the object 20 and transfers the light to the filter unit 140. With the transferred light, the filter unit 140 transmits only the light of the same wavelength band as that of the light emitted by the light emission unit 120, and blocks the light of other wavelength bands. This is to allow the sensor unit 150 to receive only the light emitted by the light emission unit 120 and not to receive any other light.

The sensor unit 150 is formed by a pixel array in which pixels are arranged in a 2D manner. If light is received, photoelectric conversion devices, such as photogates and photodiodes, disposed in each pixel convert the received light into electric charge, accumulate electric charge, and detects light information according to the amount of the accumulated electric charge. The current embodiment will be explained focusing on a case where a photogate is used as the photoelectric conversion device, and these photogates can receive light and accumulate electric charge when they are in an on state.

Figure 2:
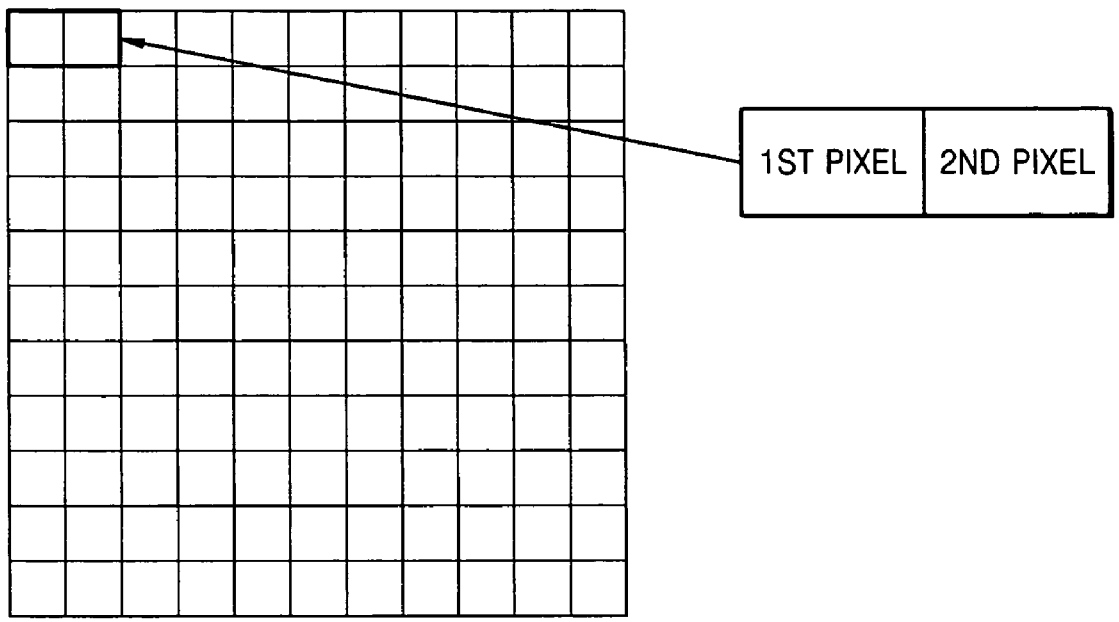
FIG. 2 is a diagram illustrating a first pixel and second pixel of a sensor unit illustrated in FIG. 1 according to an embodiment of the present invention.
Figure 3:
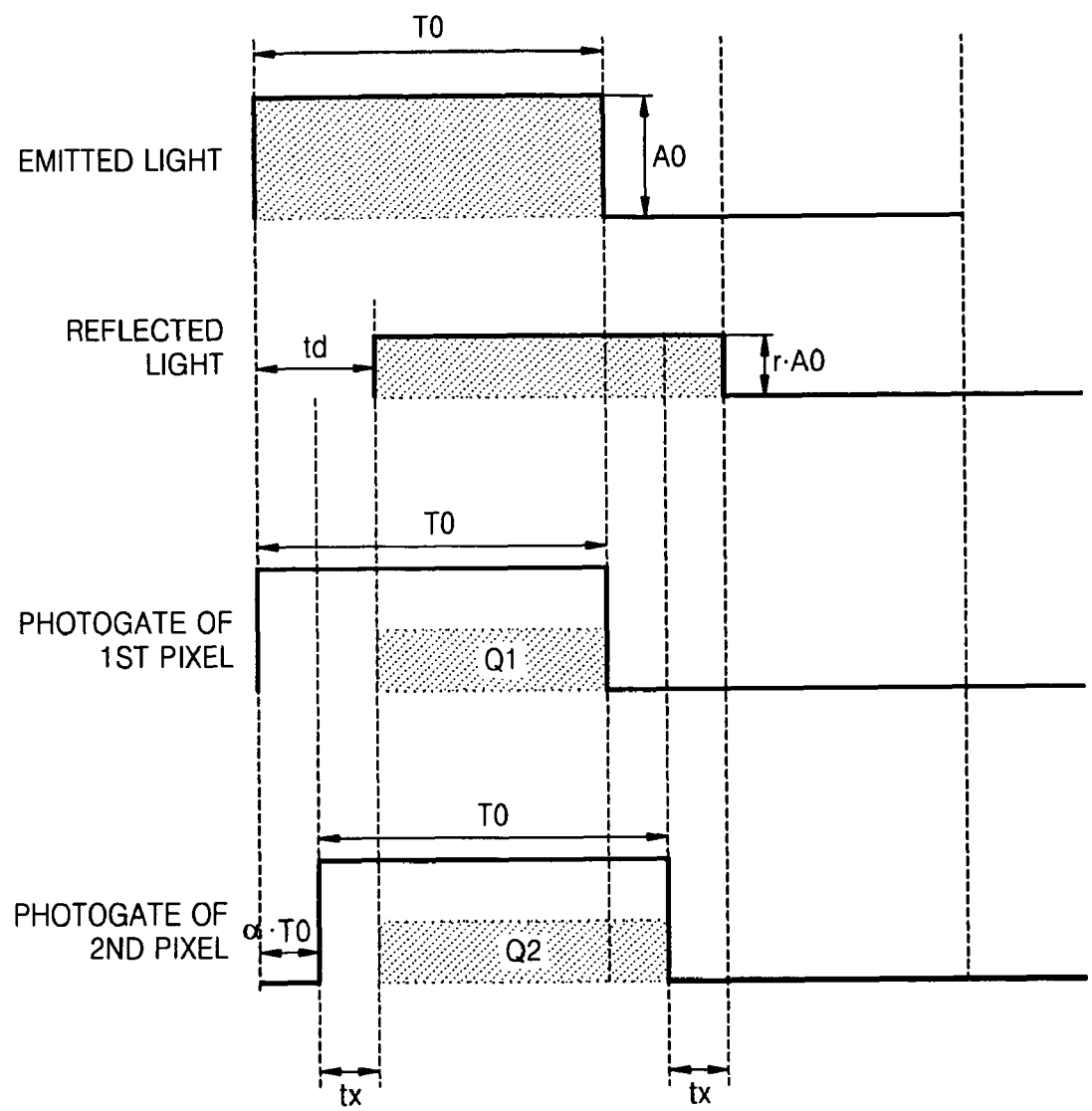
FIG. 3 is a diagram illustrating that reflected light is received after the photogate of the second pixel forming the sensor unit illustrated in FIG. 1 according to an embodiment of the present invention.

In particular, in the current embodiment, as illustrated in FIG. 2, two photogates, including the photogate of a first pixel which is a first light detection unit and the photogate of a second pixel which is a second light detection unit, are used as one group. Then, according to a control pulse signal provided from the pulse control unit 110, as illustrated in FIG. 3, the photogate of the first pixel is set to be in an on state for a time period T0 from the time when light is emitted by the light emission unit 120, and the photogate of the second pixel is set to be turned on α×T0 after the light is emitted by the light emission unit 120 and be in an on state for a time period T0. In this case, α is a value between 0 and 1, and when α is closer to 0, the time when the light is emitted is closer to the time when the photogate of the second pixel is turned on.

Also, it is assumed that the time period from the time when light is emitted to the time when the light is received by the sensor unit 150 is td, and the difference between the time when the photogate of the second pixel is turned on and the time when the light is received by the sensor unit 150 is tx. Then, tx is the same as the difference between td and α×T0.

Also, it is assumed that the intensity of the light emitted by the light emission unit 120 is A0, and the reflectance of the object 20 is r. Then, the intensity of the light arriving at the sensor unit 150 is the product of the reflectance r and the intensity A0 of the emitted light.

Then, since the light having the intensity of r×A0 is received by the photogate of the first pixel for a time period of T0−td, if it is assumed that the amount of accumulated electric charge in the photogate of the first pixel is Q1, Q1 is in proportion to (T0−td)×r×A0. This can be expressed as equation 1 below:

$$Q1 \propto (T0-td) \times r \times A0 \tag{1}$$

Likewise, since the light having the intensity of r×A0 is received by the photogate of the second pixel for a time period of T0−tx, if it is assumed that the amount of accumulated electric charge in the photogate of the second pixel is Q2, Q2 is in proportion to (T0−tx)×r×A0. This can be expressed as equation 2 below:

$$Q1 \propto (T0-tx) \times r \times A0 \tag{2}$$

The amount of accumulated electric charge in the photogate of the first pixel among the pixels for the sensor unit 150 is in proportion to (T0−td)×r×A0, and the amount of accumulated electric charge in the photogate of the second pixel is in proportion to (T0−tx)×r×A0.

The depth calculation unit 170 calculates the depth of the object 20, by using the amount of electric charge accumulated by the sensor unit 150. In particular, according to which occurs first between the time when the photogate of the second pixel is turned on and the time when light is received by the sensor unit 150, the depth calculation unit 170 calculates the depth of the object according to respective different methods.

Figure 4:
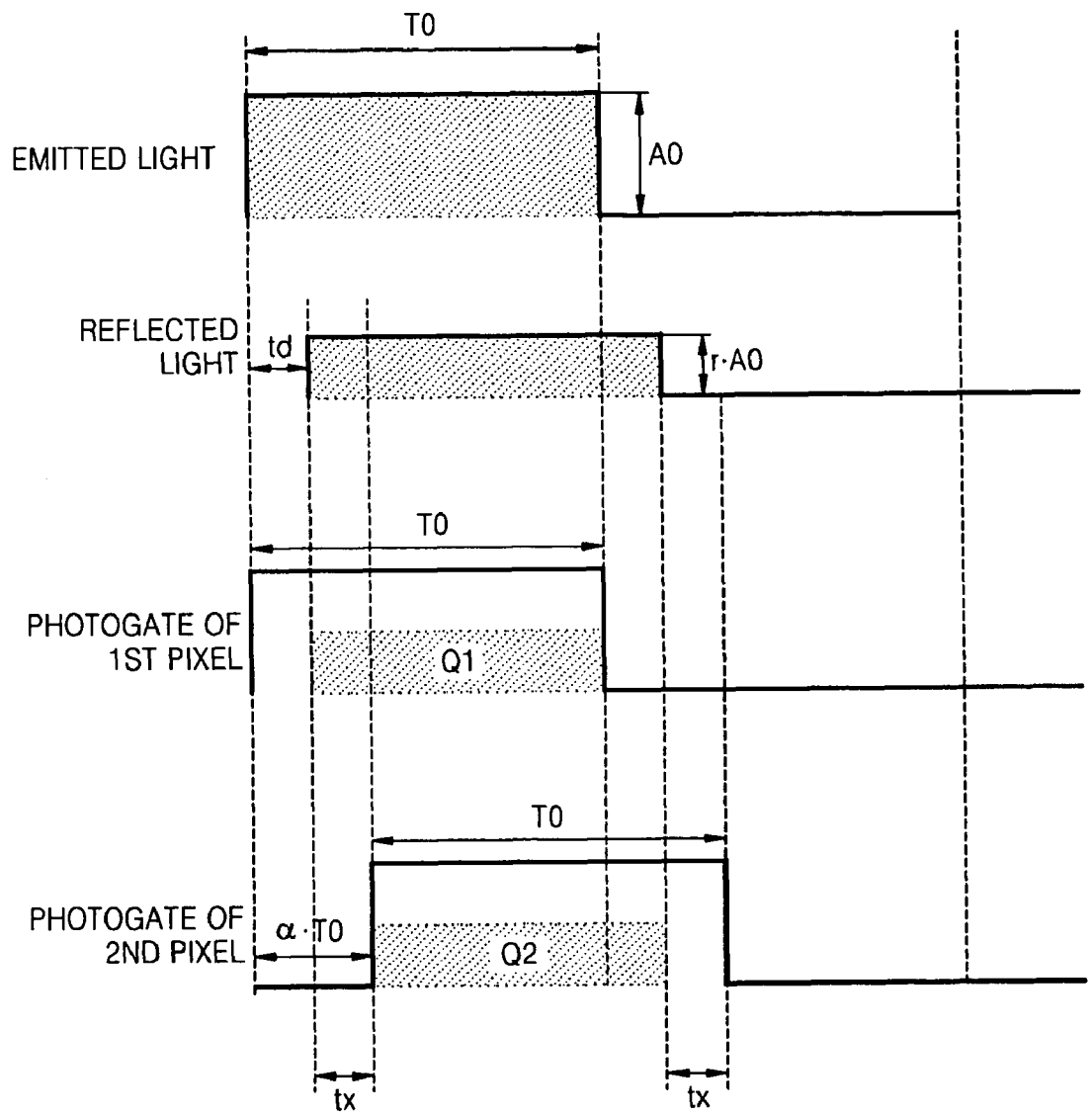
FIG. 4 is a diagram illustrating that reflected light is received before the photogate of the second pixel forming the sensor unit illustrated in FIG. 1 according to an embodiment of the present invention.

FIG. 3 is a diagram illustrating a case where the time when the photogate of the second pixel is turned on occurs before light is received by the sensor unit 150, and FIG. 4 is a diagram illustrating a case where the time when light is received by the sensor unit 150 occurs before the photogate of the second pixel is turned on. Referring to FIGS. 3 and 4, the reason why the depth of the object 20 is calculated according to respective different methods will now be explained.

First, Q1 which is the amount of electric charge accumulated in the photogate of the first pixel is in proportion to the product of the time period (T0−td) in which light is received, and the intensity of light r×A0. Also, Q2 which is the amount of electric charge accumulated in the photogate of the second pixel is in proportion to the product of the time period (T0−tx) in which light is received, and the intensity of light r×A0. Accordingly, equation 3 can be derived as below:

$$\frac{Q1}{Q2} = \frac{(T0-td) \times r \times A0}{(T0-tx) \times r \times A0} \tag{3}$$

Meanwhile, tx is the difference between the time when the photogate of the second pixel is turned on and the time when the light is received. Accordingly, if light is received by the sensor unit 150 after the photogate of the second pixel is turned on, as illustrated in FIG. 3, tx is a value obtained by subtracting α×T0 from td. If light is received before the photogate of the second pixel is turned on, as illustrated in FIG. 4, tx is a value obtained by subtracting td from α×T0. That is, since tx value of equation 3 varies according to which occurs first between the time when the photogate of the second pixel is turned on and the time when light is received by the sensor unit 150, the depth is calculated according to respective different methods.

Accordingly, as illustrated in FIG. 3, if light is received by the sensor unit 150 after the photogate of the second pixel is turned on, tx is a value obtained by subtracting α×T0 from td, and by substituting td−α×T0 for tx in equation 3, equation 4 below can be obtained:

$$\frac{Q1}{Q2} = \frac{T0 - td}{T0 - td + \alpha \times T0} \tag{4}$$

Also, from equation 4, td which is the time period from the time when light is emitted to the time when the light is received by the sensor unit 150 can be calculated as equation 5 below:

$$td = \frac{(1+\alpha) \times Q1 - Q2}{Q1 - Q2} \times T0 \tag{5}$$

Also, as illustrated in FIG. 4, if light is received by the sensor unit 150 before the photogate of the second pixel is turned on, tx is a value obtained by subtracting td from α×T0, and by substituting α×T0−td for tx in equation 3, equation 6 below can be obtained:

$$\frac{Q1}{Q2} = \frac{T0 - td}{T0 - \alpha \times T0 + td} \quad (6)$$

Also, from equation 6, td which is the time period from the time when light is emitted to the time when the light is received by the sensor unit 150 can be calculated as equation 7 below:

$$td = \frac{Q2 - (1-\alpha) \times Q1}{Q1 + Q2} \times T0 \quad (7)$$

As described above, if light is received by the sensor unit 150 after the photogate of the second pixel is turned on, td is calculated by using equation 5, and if light is received by the sensor unit 150 before the photogate of the second pixel is turned on, td is calculated by using equation 7.

Then, it is necessary to easily determine which occurs first between the time when the emitted light is received and the time when the second light information is detected.

As illustrated in FIG. 3, if light is received by the sensor unit 150 after the photogate of the second pixel is turned on, td is greater than α×T0, and therefore, td≧α·T0. If td of equation 5 is substituted in this expression and calculated, the relationship between Q1 and Q2 is as equation 8 below:

$$Q2-Q1 \leq \alpha \times Q2 \quad (8)$$

Reversely, as illustrated in FIG. 4, if light is received by the sensor unit 150 before the photogate of the second pixel is turned on, td is less than α×T0, and therefore, td<α·T0. If td of equation 7 is substituted in this expression and calculated, the relationship between Q1 and Q2 is as equation 9 below:

$$Q2-Q1 > \alpha \times Q2 \quad (9)$$

Accordingly, if the amount Q1 of electric charge accumulated in the photogate of the first pixel and the amount Q2 of electric charge accumulated in the photogate of the second pixel satisfy expression 8, the determination unit 160 determines that the time when the photogate of the second pixel is turned on occurs before light is received. Meanwhile, if the amount Q1 of electric charge accumulated in the photogate of the first pixel and the amount Q2 of electric charge accumulated in the photogate of the second pixel satisfy expression 9, the determination unit 160 determines that the time when the photogate of the second pixel is turned on occurs after light is received.

Also, if the determination result of the determination unit 160 indicates that the time when the photogate of the second pixel is turned on occurs before light is received, the depth calculation unit 170 is made to calculate td which is the time period between the time when light is emitted to the time when the light is received by the sensor unit 150, by using equation 5. That is, td is calculated by calculating:

$$td = \frac{(1+\alpha) \times Q1 - Q2}{Q1 - Q2} \times T0$$

Meanwhile, if the determination result of the determination unit 160 indicates that the time when the photogate of the second pixel is turned on occurs after light is received, the depth calculation unit 170 calculates td which is the time period between the time when light is emitted to the time when the light is received by the sensor unit 150, by using equation 7. That is, td is calculated by calculating:

$$td = \frac{Q2 - (1-\alpha) \times Q1}{Q1 + Q2} \times T0$$

Then, the depth calculation unit 170 divides the calculated td by 2, and multiplies by the speed of light c, i.e., calculates ½×c×td, thereby calculating the depth of the object 20. The depth calculation unit 170 repeatedly performs the calculation for all pixels forming the sensor unit 150, thereby calculating the depth of the object 20.

The depth image generation unit 180 generates a depth image of the object 20 by using the depth calculated by the depth calculation unit 170. For example, the depth image generation unit 180 may express a depth having a small depth value with a bright color in the image, and a depth having a big depth value with a dark color in the image.

In another embodiment of the present invention, when the sensor unit 150 is formed by a pixel array in which pixels are arranged in a 2D manner, if one pixel is formed by a plurality of photogates such as photogate 1 and photogate 2, a depth value can be calculated with respect to one pixel, and therefore the resolution of a depth image can be enhanced. In this case, the photogate of the first pixel corresponds to the photogate 1 and the photogate of the second pixel corresponds to the photogate 2, and a depth image can be generated by using the same method as that using the first and second pixels.

Figure 6:
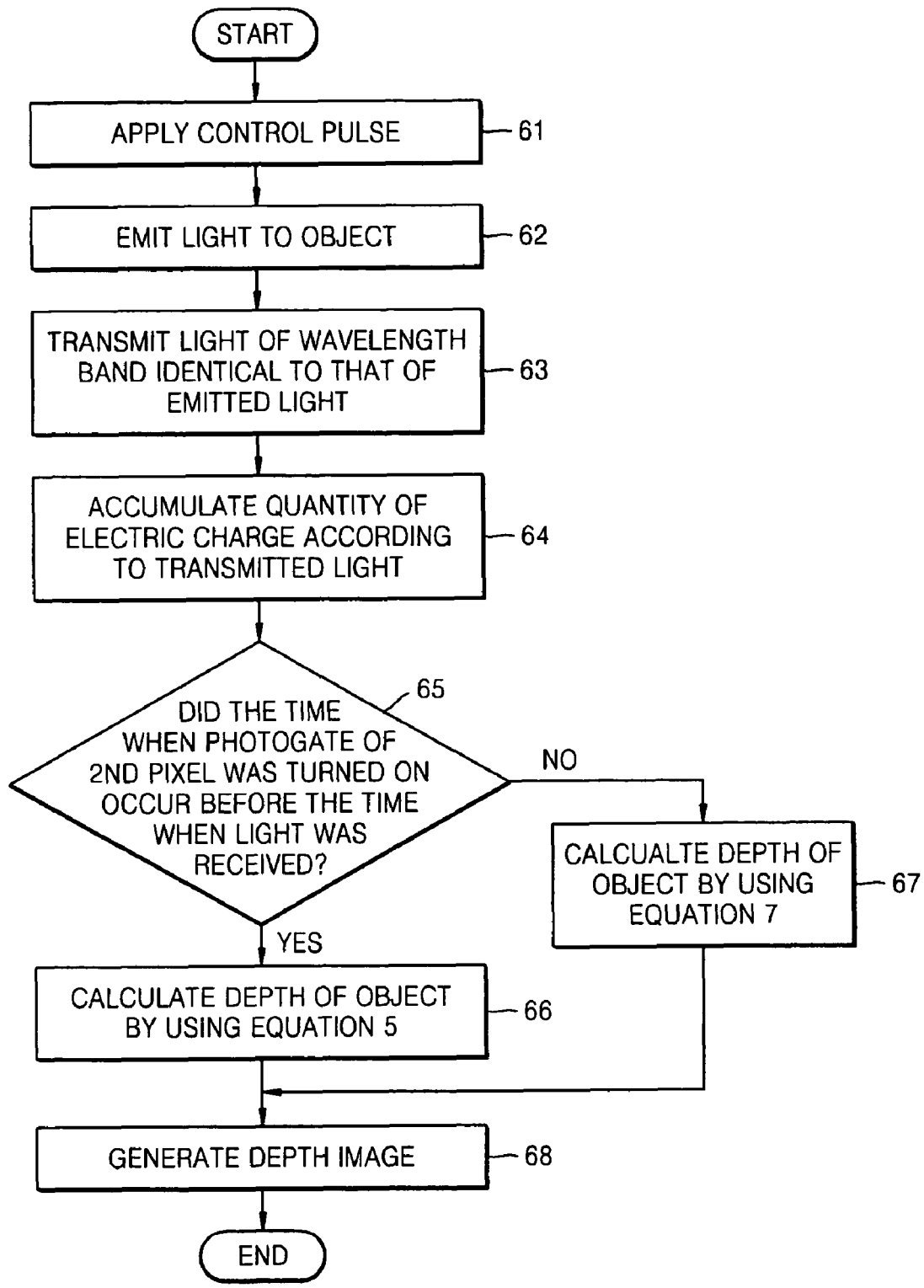
FIG. 6 is a flowchart illustrating a method of generating a depth image according to an embodiment of the present invention.

FIG. 6 is a flowchart illustrating a method of generating a depth image according to an embodiment of the present invention. Referring to FIG. 6, the method of generating a depth image according to the current embodiment is formed by operations processed in a time series in the apparatus for generating a depth image illustrated in FIG. 1. Accordingly, even though explanations are not included below, the explanations described above with respect to the apparatus for generating a depth image illustrated in FIG. 1 are applied to the method of generating a depth image according to the current embodiment.

In operation 61, the apparatus 10 for generating a depth image generates a control pulse signal which is on and off alternately according to a predetermined time period.

In operation 62, the apparatus 10 for generating a depth image emits light to an object according to the control pulse signal provided in operation 61. For example, if the provided control pulse signal is on, light is emitted to the object, and if the provided control pulse signal is off, light is not emitted to the object. Here, it is assumed that a time period in which light is emitted is T0.

In operation 63, the apparatus 10 for generating a depth image transmits only the light of the same wavelength band as that of the emitted light, and blocks the light of other wavelength bands.

In operation 64, the apparatus 10 for generating a depth image generates electric charge according to the light transmitted in operation 63, and accumulates the generated electric charge. In this case, in the photogate of the first pixel of the apparatus 10 for generating a depth image, the light having the intensity of r×A0 is received for a time period of T0−td, and therefore the amount Q1 of electric charge in proportion to (T0−td)×r×A0 as equation 1 is accumulated. Also, in the photogate of the second pixel, the light having the intensity of r×A0 is received for a time period of T0−tx, and therefore the amount Q2 of electric charge in proportion to (T0−tx)×r×A0 as equation 2 is accumulated.

In operation 65, the apparatus 10 for generating a depth image determines which occurs first between the time when the photogate of the second pixel is turned on and the time when light is received. For this, the apparatus 10 for generating a depth image determines whether or not Q1 and Q2 which are amounts of electric charge accumulated in operation 64 satisfy the condition of equation 8, and if the condition of equation 8 is satisfied, it is determined that the photogate of the second pixel is turned on before light is received.

In operation 66, if the determination result in operation 65 indicates that the time when the photogate of the second pixel is turned on occurs before light is received, the apparatus 10 for generating a depth image calculates td which is the time period from the time when light is emitted to the time when light is received, by using equation 5, and by calculating ½×c×td, calculates the depth of the object. In operation 67, if the determination result in operation 65 indicates that the time when the photogate of the second pixel is turned on does not occur before light is received, that is, the time when light is received occurs before the photogate is turned on, the apparatus 10 for generating a depth image calculates td which is the time period from the time when light is emitted to the time when light is received, by using equation 7, and by calculating ½×c×td, calculates the depth of the object.

In operation 68, the apparatus 10 for generating a depth image generates a depth image of the object by using the depth of the object calculated in operations 66 and 67.

Figure 5:
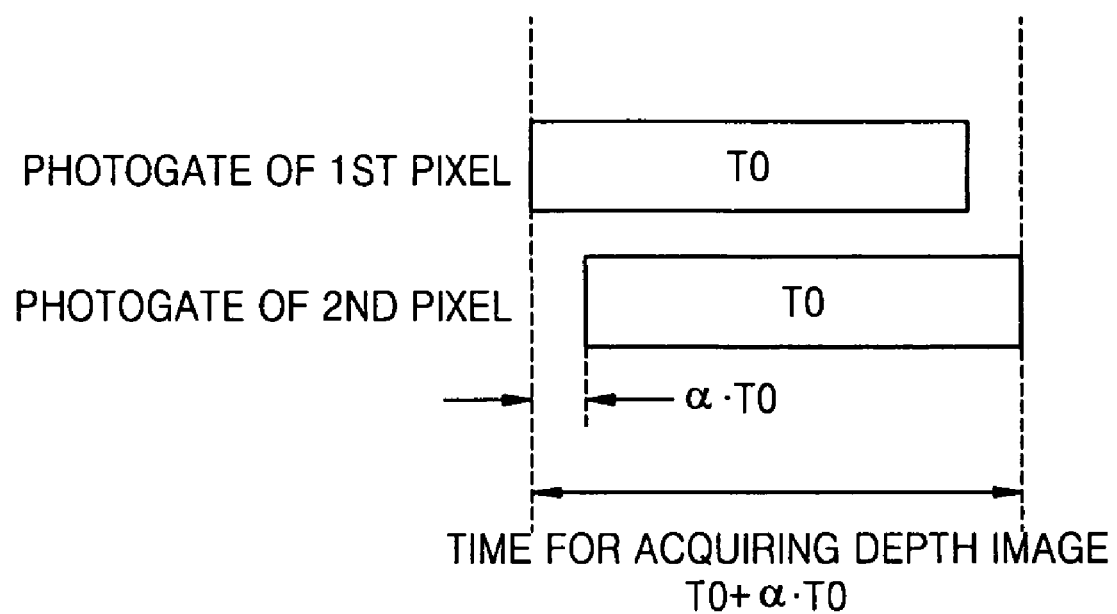
FIG. 5 is a diagram illustrating a time taken for acquiring a depth image according to an embodiment of the present invention.

According to current embodiment as described above, the time taken for acquiring a depth image is just T0+α×T0, as illustrated in FIG. 5, thereby allowing a depth image to be taken in a shorter time. In addition, if a is approximated to 0, a depth image can be acquired in a time close to T0 which is a time period in which light is emitted, thereby increasing the frame rate which is the number of frames that can be acquired in a predetermined time unit.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), for example. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of generating a depth image, the method comprising:
   emitting light to an object for a first predetermined time period;
   detecting first light information of the object for the first predetermined time period from the time when the light is emitted;
   detecting second light information of the object for the first predetermined time period by a light detection unit, when the light detection unit is activated after a second predetermined time period from the time when the light is emitted;
   determining which occurs first between the time when reflected light is received and the time when the second light information is detected;
   calculating a time period from the time when the light is emitted to the time when the reflected light is received, according to the determination; and
   by using the calculated time period and detected first and second light information, generating a depth image of the object.

2. The method of claim 1, wherein in the generating of the depth image, the depth image of the object is generated by using a ratio between the detected first light information and second light information.

3. A method of generating a depth image, the method comprising:
   emitting light to an object for a first predetermined time period;
   detecting first light information of the object for the first predetermined time period from the time when the light is emitted;
   detecting second light information of the object for the first predetermined time period, after a second predetermined time period from the time when the light is emitted; and
   by using the detected first and second light information, generating a depth image of the object,
   wherein the generating of the depth image comprises:
   determining which occurs first between the time when reflected light is received and the time when the second light information is detected; and
   if the determination result indicates that the time when the reflected light is received occurs before the second light information is detected,
   generating the depth image of the object, by using that the time when the second light information is detected is in proportion to the time period obtained by subtracting a time period from the time when the light is emitted to the time when the second light information is detected, from a time period from the time when the light is emitted to the time when the reflected light is received.

4. A method of generating a depth image, the method comprising:
   emitting light to an object for a first predetermined time period;

detecting first light information of the object for the first predetermined time period from the time when the light is emitted;

detecting second light information of the object for the first predetermined time period, after a second predetermined time period from the time when the light is emitted; and by using the detected first and second light information, generating a depth image of the object, wherein the generating of the depth image comprises:

determining which occurs first between the time when reflected light is received and the time when the second light information is detected; and if the determination result indicates that the second light information is detected occurs before the time when the reflected light is received, generating the depth image of the object, by using that the time when the second light information is detected is in proportion to the time period obtained by subtracting a time period from the time when the light is emitted to the time when the second light information is detected from a time period from the time when the light is emitted to the time when the reflected light is received.

5. The method of claim 1, wherein the second predetermined time period is shorter than the first predetermined time period.

6. The method of claim 3, wherein in the determining of which occurs first between the time when the reflected light is received and the time when the second light information is detected, the determining is performed by examining whether the difference between the detected second and first light information is greater than a value obtained by multiplying the detected second light information by a predetermined number.

7. The method of claim 4, wherein in the determining of which occurs first between the time when the reflected light is received and the time when the second light information is detected, the determining is performed by examining whether the difference between the detected second and first light information is greater than a value obtained by multiplying the detected second light information by a predetermined number.

8. A non-transitory computer readable recording medium having embodied thereon a computer program for executing the method of claim 1.

9. An apparatus to generate a depth image, the apparatus comprising:

a light emission unit to emit light to an object for a first predetermined time period;

a first light detection unit to detect first light information of the object for the first predetermined time period from the time when the light is emitted;

a second light detection unit to detect second light information of the object for the first predetermined time period, when the second light detection unit is activated after a second predetermined time period from the time when the light is emitted; and a depth image generation unit to determine which occurs first between the time when reflected light is received and the time when the second light information is detected, to calculate a time period from the time when the light is emitted to the time when the reflected light is received, according to the determination, and to generate a depth image of the object by using the calculated time period and the detected first and second light information.

10. The apparatus of claim 9, wherein the depth image generation unit generates the depth image of the object, by using a ratio between the detected first light information and second light information.

11. An apparatus to generate a depth image, the apparatus comprising:

a light emission unit to emit light to an object for a first predetermined time period;

a first light detection unit to detect first light information of the object for the first predetermined time period from the time when the light is emitted;

a second light detection unit to detect second light information of the object for the first predetermined time period, after a second predetermined time period from the time when the light is emitted; and a depth image generation unit, by using the detected first and second light information, to generate a depth image of the object, wherein the depth image generation unit comprises:

a determination unit to determine which occurs first between the time when reflected light is received and the time when the second light information is detected; and a depth calculation unit, if the determination result indicates that the time when the reflected light is received occurs before the second light information is detected, to generate the depth image of the object, by using that the time when the second light information is detected is in proportion to the time period obtained by subtracting a time period from the time when the light is emitted to the time when the second light information is detected, from a time period from the time when the light is emitted to the time when the reflected light is received.

12. An apparatus to generate a depth image, the apparatus comprising:

a light emission unit to emit light to an object for a first predetermined time period;

a first light detection unit to detect first light information of the object for the first predetermined time period from the time when the light is emitted;

a second light detection unit to detect second light information of the object for the first predetermined time period, after a second predetermined time period from the time when the light is emitted; and a depth image generation unit, by using the detected first and second light information, to generate a depth image of the object, wherein the depth image generation unit comprises:

a determination unit to determine which occurs first between the time when reflected light is received and the time when the second light information is detected; and a depth calculation unit, if the determination result indicates that the second light information is detected occurs before the time when the reflected light is received, to generate the depth image of the object, by using that the time when the second light information is detected is in proportion to the time period obtained by subtracting a time period from the time when the light is emitted to the time when the second light information is detected from a time period from the time when the light is emitted to the time when the reflected light is received.

13. The apparatus of claim 9, wherein the second predetermined time period is shorter than the first predetermined time period.

14. The apparatus of claim 11, wherein the depth image generation unit determines which occurs first between the time when the reflected light is received and the time when the second light information is detected, by examining whether the difference between the detected second and first light information is greater than a value obtained by multiplying the detected second light information by a predetermined number.

15. The apparatus of claim 12, wherein the depth image generation unit determines which occurs first between the time when the reflected light is received and the time when the second light information is detected, by examining whether the difference between the detected second and first light information is greater than a value obtained by multiplying the detected second light information by a predetermined number.

* * * * *